(12) United States Patent
Adoline

(10) Patent No.: US 7,677,539 B2
(45) Date of Patent: Mar. 16, 2010

(54) FORCE CONTROL STRUT

(75) Inventor: Jack W. Adoline, Toledo, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 11/361,659

(22) Filed: Feb. 23, 2006

(65) Prior Publication Data

US 2007/0194506 A1    Aug. 23, 2007

(51) Int. Cl.
*F16F 1/06* (2006.01)

(52) U.S. Cl. ................ 267/168; 267/64.12; 267/290; 267/291; 188/304

(58) Field of Classification Search .......... 267/291, 267/64.11, 64.12, 64.13, 64.25, 64.26, 290, 267/168; 188/304; 180/69.21; 296/76
See application file for complete search history.

(56) References Cited

U.S. PATENT DOCUMENTS

| | | | |
|---|---|---|---|
| 571,972 | A | 11/1896 | Janney |
| 1,329,561 | A | 2/1920 | Thompson |
| 2,948,529 | A | 8/1960 | Maier |
| 3,131,921 | A | 5/1964 | Karbowniczek |
| 3,447,797 | A * | 6/1969 | Roberts ................ 267/34 |
| 3,977,712 | A | 8/1976 | Northrop |
| RE29,545 | E | 2/1978 | Deisenroth |
| 4,406,473 | A * | 9/1983 | Sexton ................ 280/89.11 |
| 4,651,979 | A | 3/1987 | Freitag |
| 4,693,343 | A | 9/1987 | Boyd |
| 4,721,322 | A * | 1/1988 | Hawkins ................ 280/276 |
| 4,822,012 | A * | 4/1989 | Sketo ................ 267/221 |
| 4,826,094 | A * | 5/1989 | Whiteley ................ 242/485.9 |
| 4,962,916 | A | 10/1990 | Palinkas |
| 5,014,004 | A | 5/1991 | Kreibich |
| 5,291,974 | A | 3/1994 | Bianchi |
| 5,360,123 | A | 11/1994 | Johnston |
| 5,454,550 | A * | 10/1995 | Christopherson ......... 267/221 |
| 5,482,261 | A | 1/1996 | Ortega |
| 5,511,868 | A | 4/1996 | Eftefield |
| 5,620,066 | A | 4/1997 | Schuttler |
| 5,728,174 | A | 3/1998 | Fitzlaff |
| 5,810,339 | A | 9/1998 | Kuspert |

(Continued)

FOREIGN PATENT DOCUMENTS

DE    2722884 A1    11/1978

(Continued)

*Primary Examiner*—Xuan Lan Nguyen
(74) *Attorney, Agent, or Firm*—Fay Sharpe LLP; Brian E. Turung

(57) ABSTRACT

A force control strut including a housing having first and second ends and an internal chamber, a rod member having an inner end reciprocally movable inside the housing and along the internal chamber, a guide member forming a bushing allowing reciprocation of the rod member in the housing, a bottom plug fixed in the internal chamber, a guide piston secured to an inner end of the rod and slidable along an inner surface of the internal chamber, a first coil spring positioned between the guide piston and one end of the housing to bias the rod member in a given direction in the housing, a first external connector fixed to the rod member, a second connector fixed to the bottom plug, and a damper that includes a plunger reciprocally mounted in a force controlling passageway inside the rod member and movable in a passageway of the rod member.

17 Claims, 12 Drawing Sheets

U.S. PATENT DOCUMENTS

| | | |
|---|---|---|
| 5,887,857 A | 3/1999 | Perrin |
| 5,946,946 A | 9/1999 | Sharp |
| 5,984,058 A | 11/1999 | Danneker |
| 6,026,755 A | 2/2000 | Long |
| 6,179,099 B1 | 1/2001 | Koch |
| 6,199,843 B1 | 3/2001 | DeGrace |
| 6,237,904 B1 * | 5/2001 | Shepherd .................... 267/150 |
| 6,673,002 B2 | 1/2004 | Trovinger et al. |
| 6,773,002 B2 | 8/2004 | Adoline |
| 6,773,003 B2 | 8/2004 | Dermody, Jr. |
| 2004/0222579 A1 | 11/2004 | Adoline |

FOREIGN PATENT DOCUMENTS

| | | |
|---|---|---|
| DE | 3716205 A1 | 11/1987 |
| DE | 393 9118 A1 | 5/1991 |
| DE | 3716205 C2 | 2/1993 |
| DE | 19 504961 | 3/1999 |
| DE | 19504961 C2 | 3/1999 |
| DE | 200 00940 U1 | 5/2000 |
| GB | 2036247 A | 6/1980 |
| JP | 5 7057934 | 4/1982 |

* cited by examiner

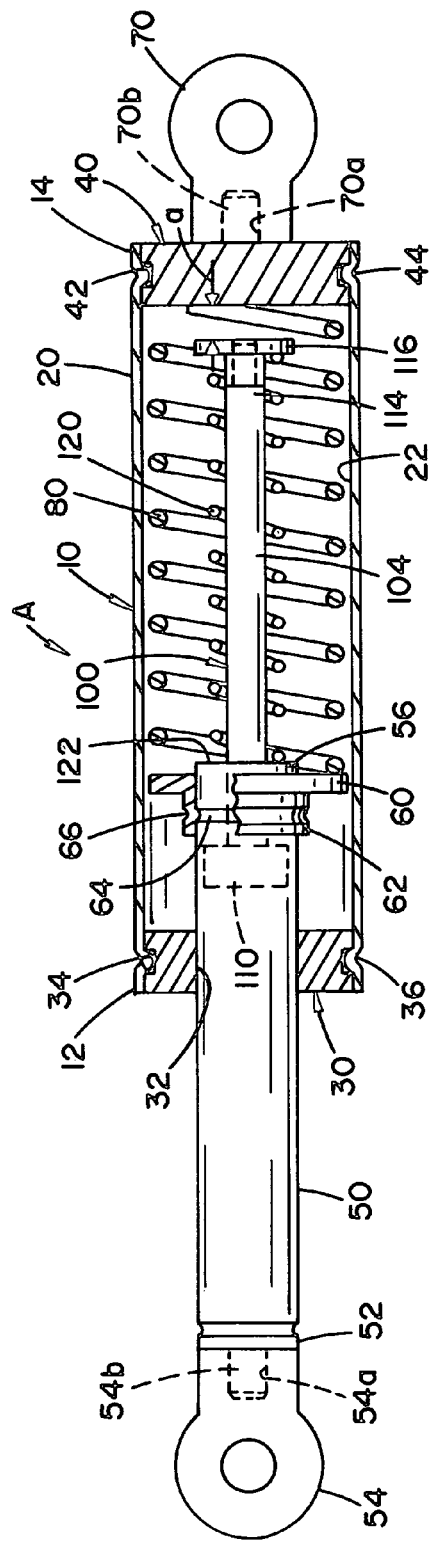

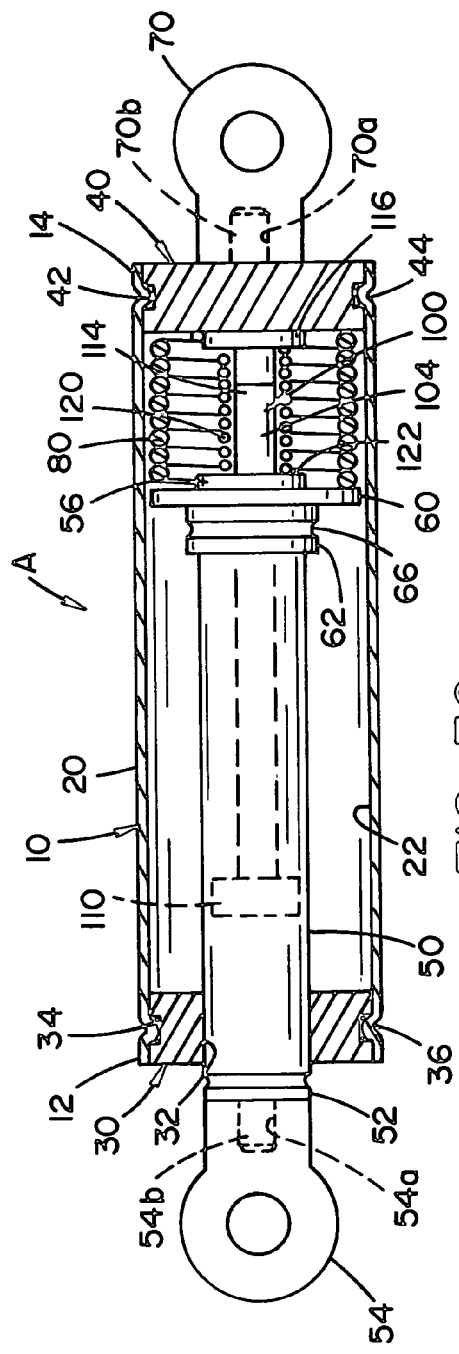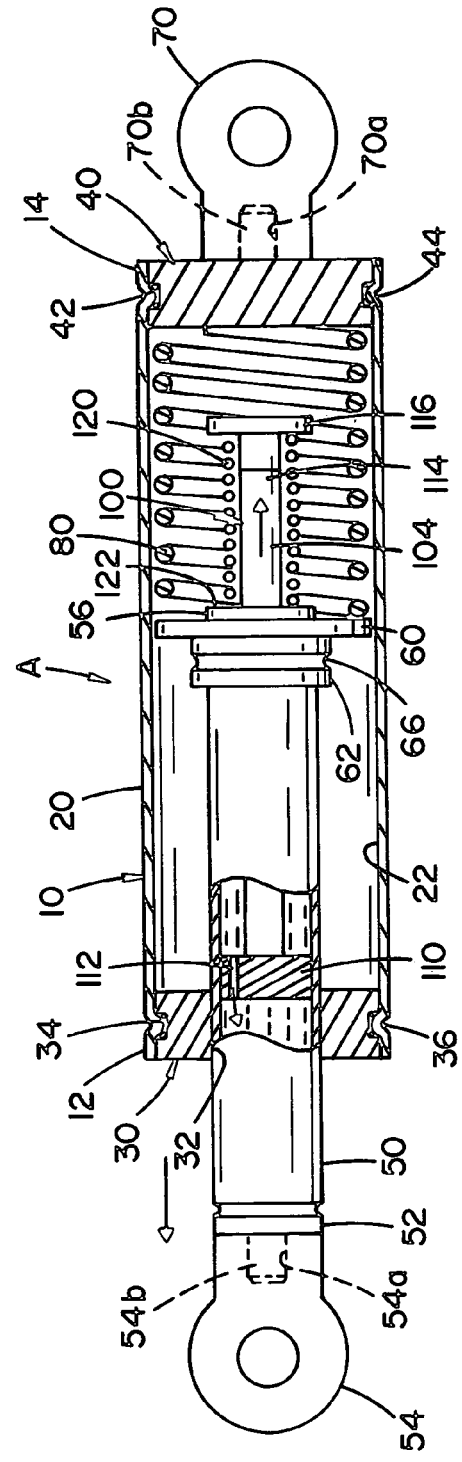

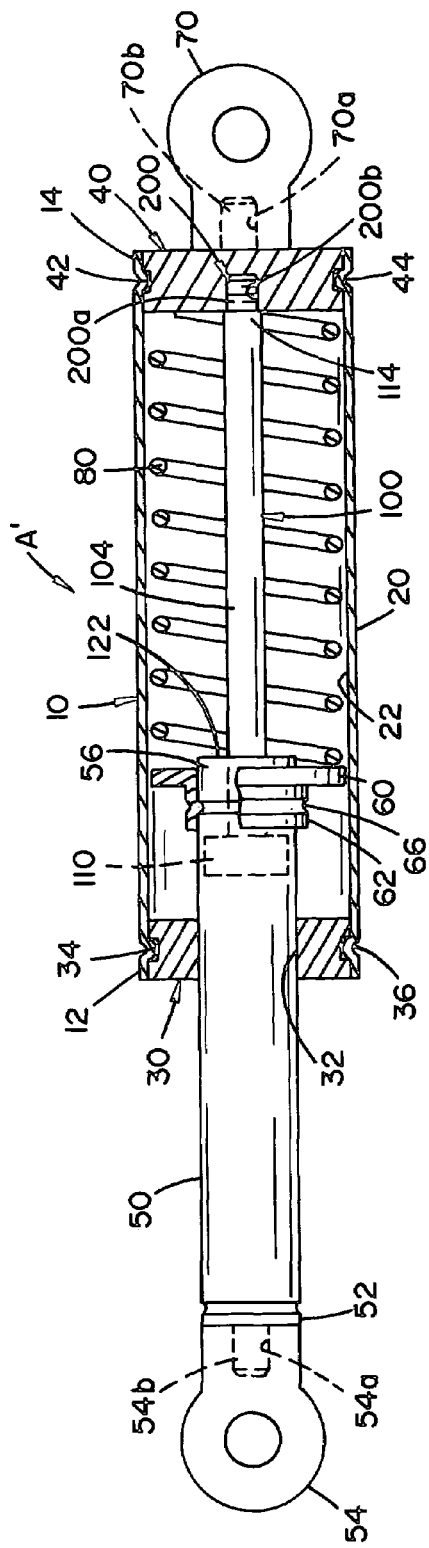
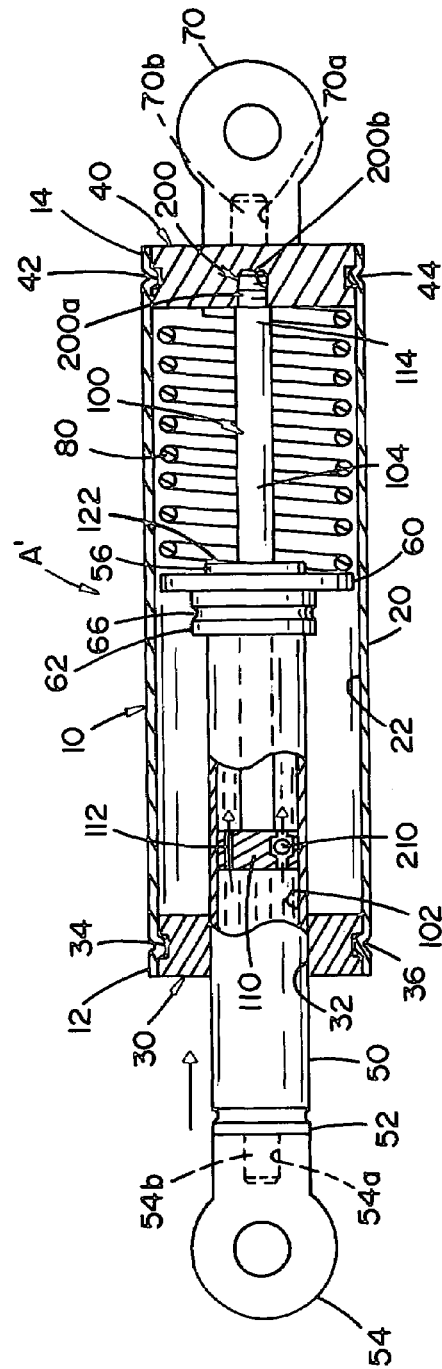

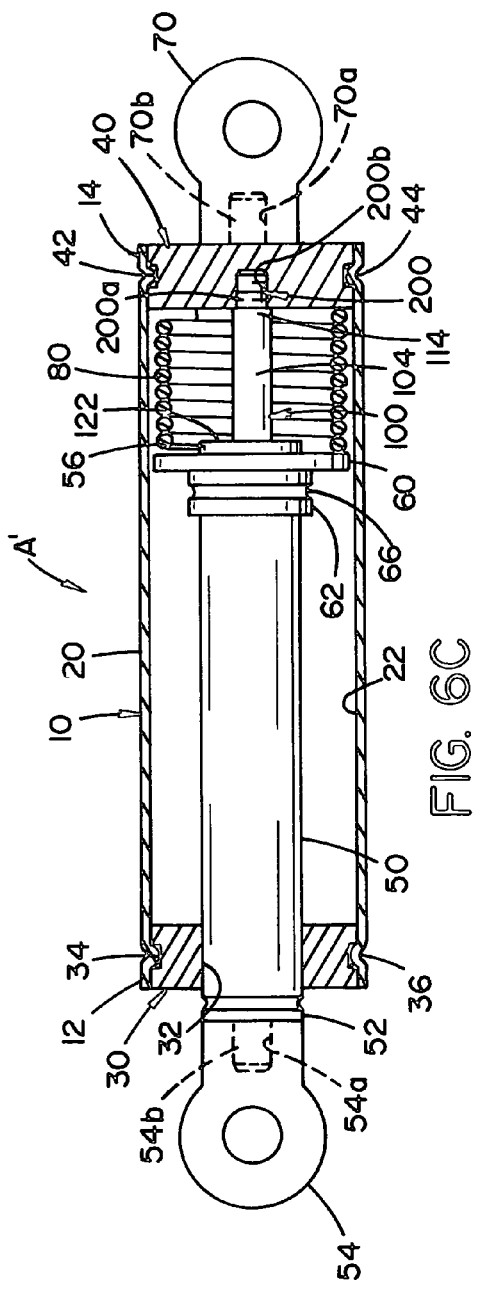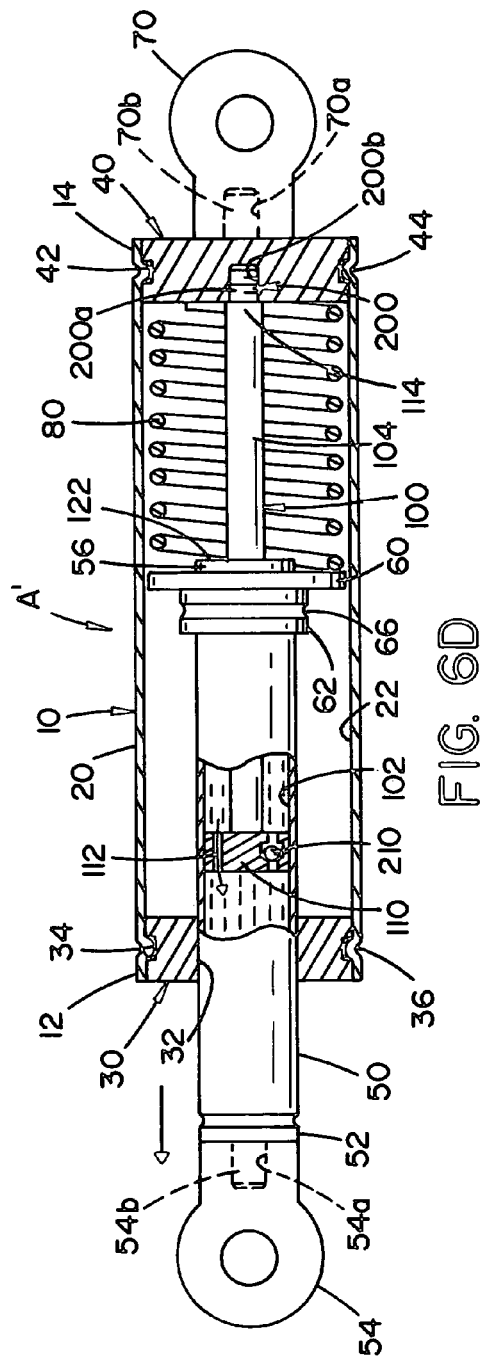

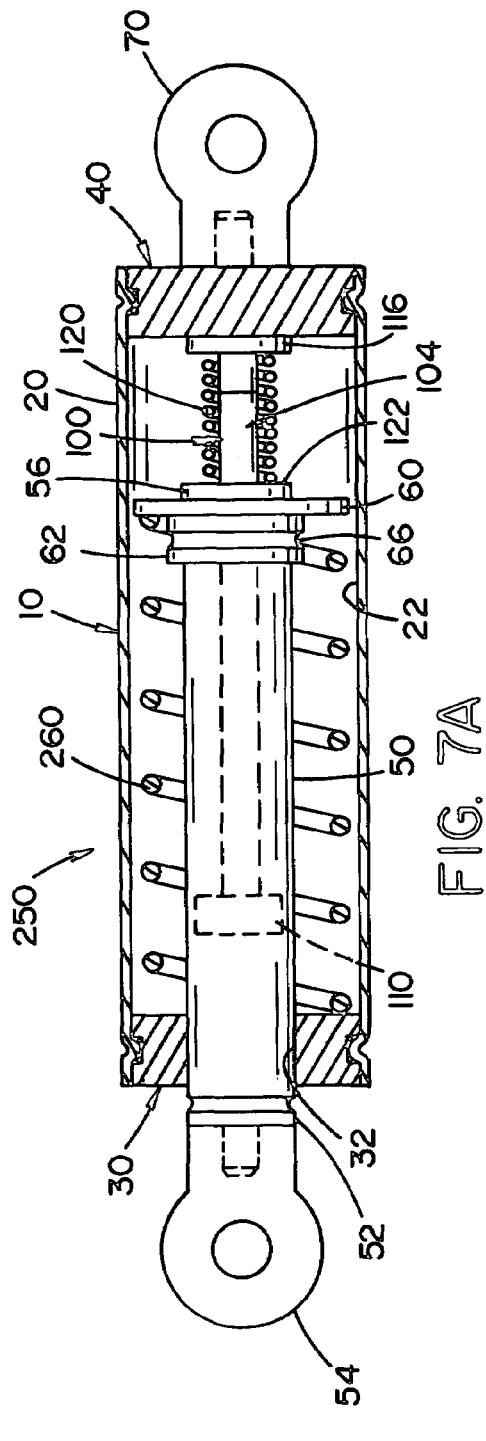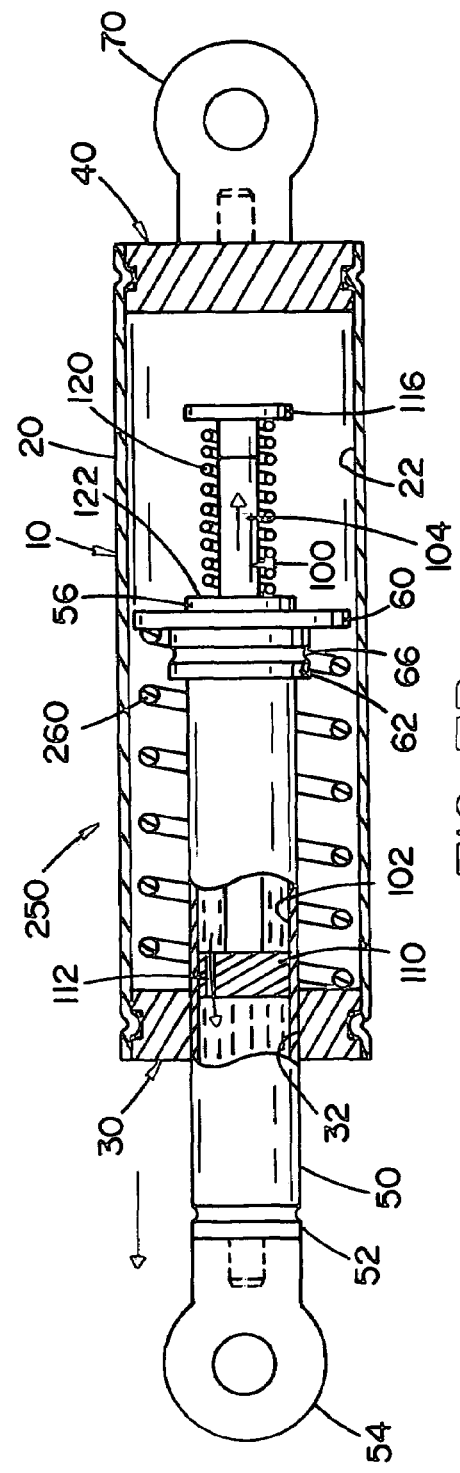

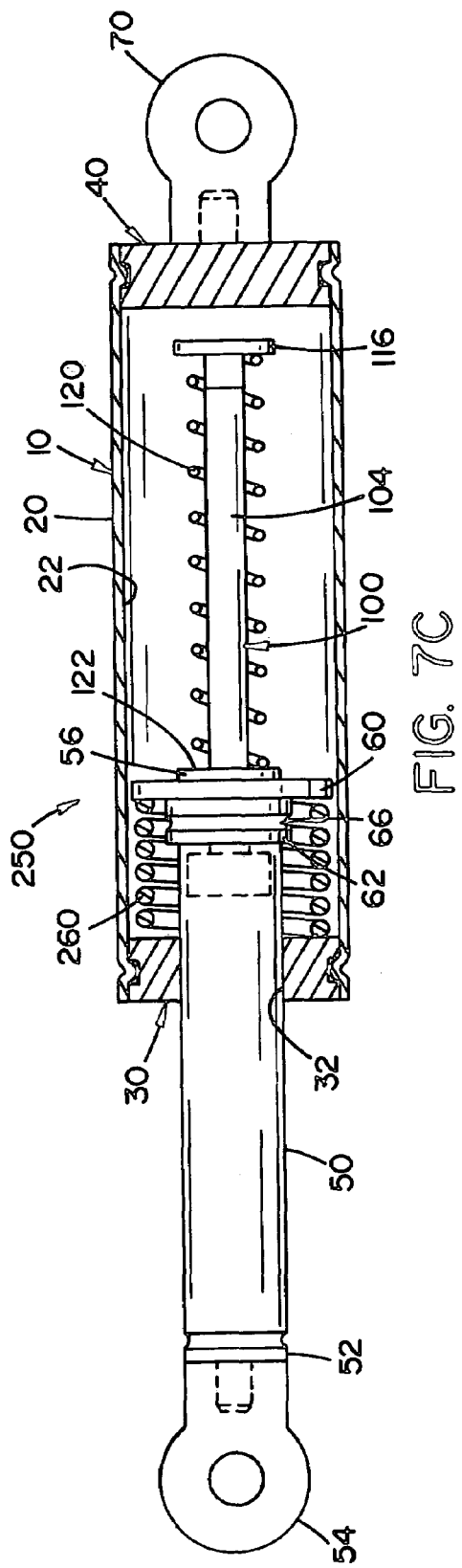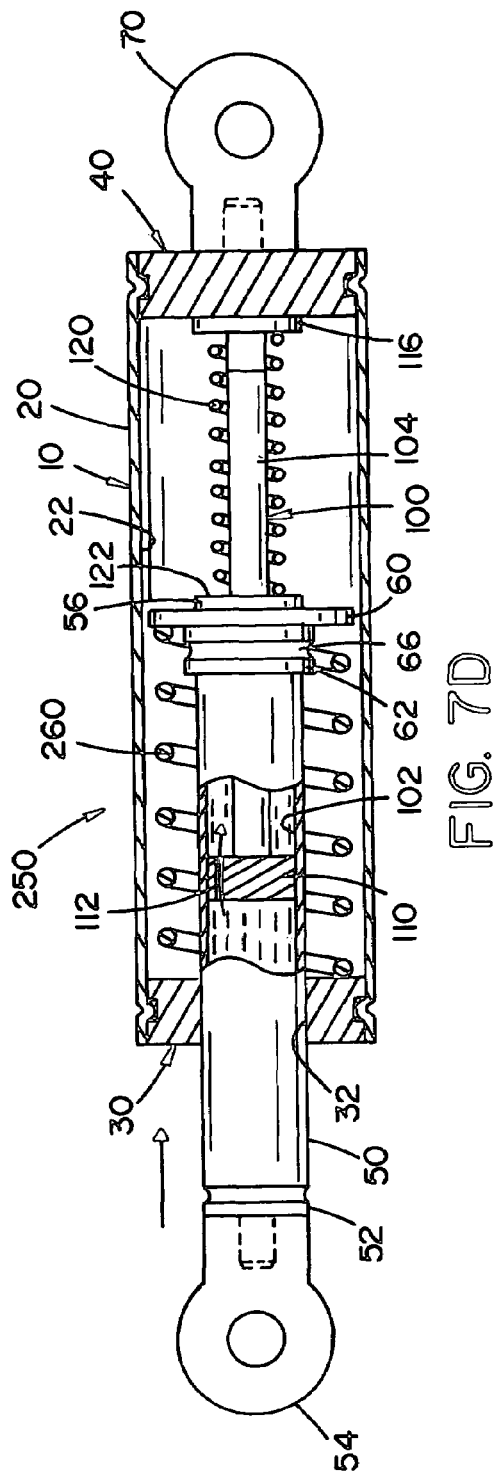

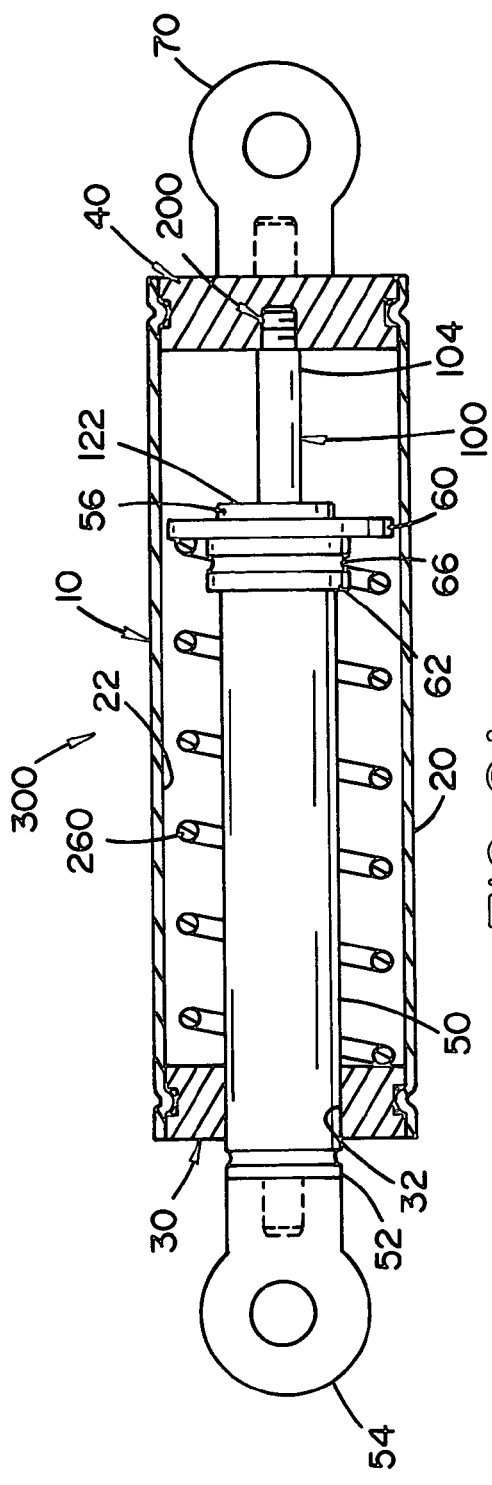
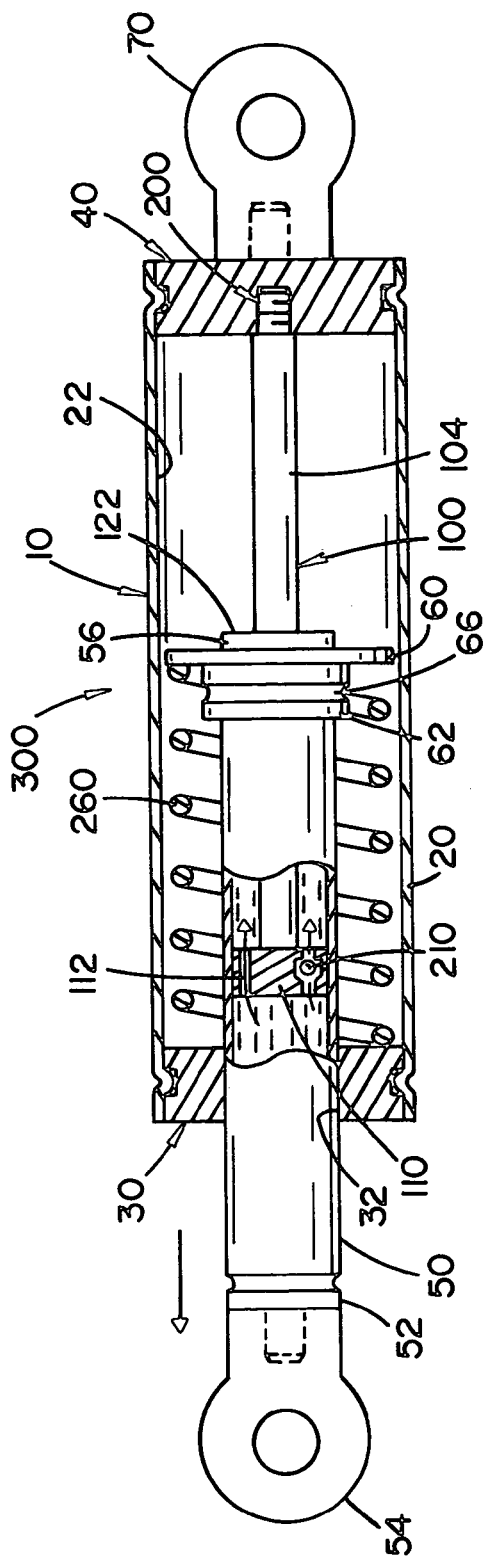
FIG. 8A
FIG. 8B

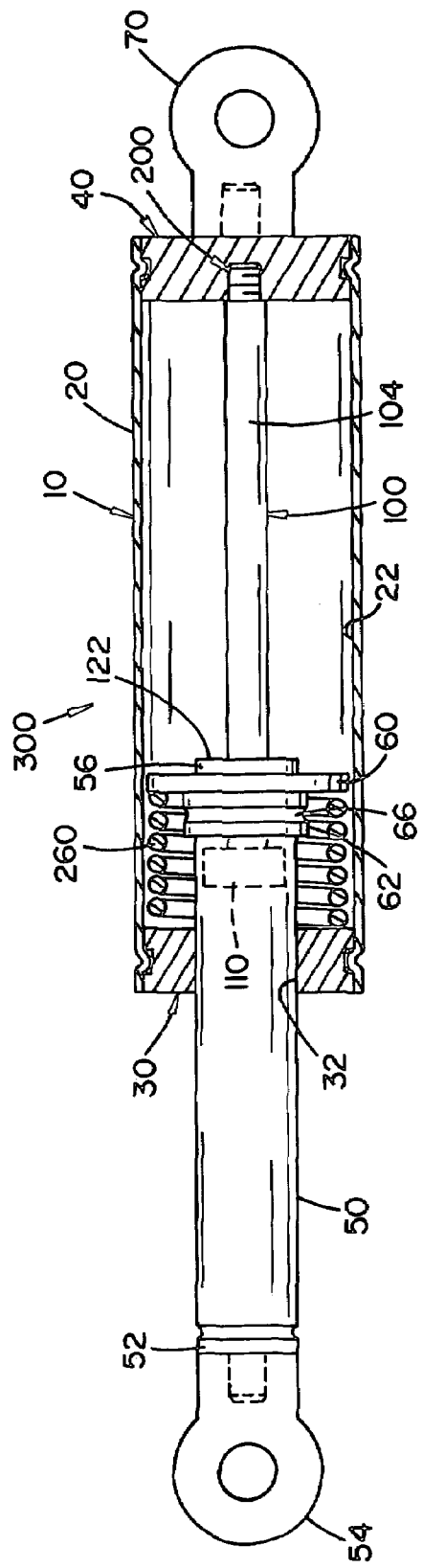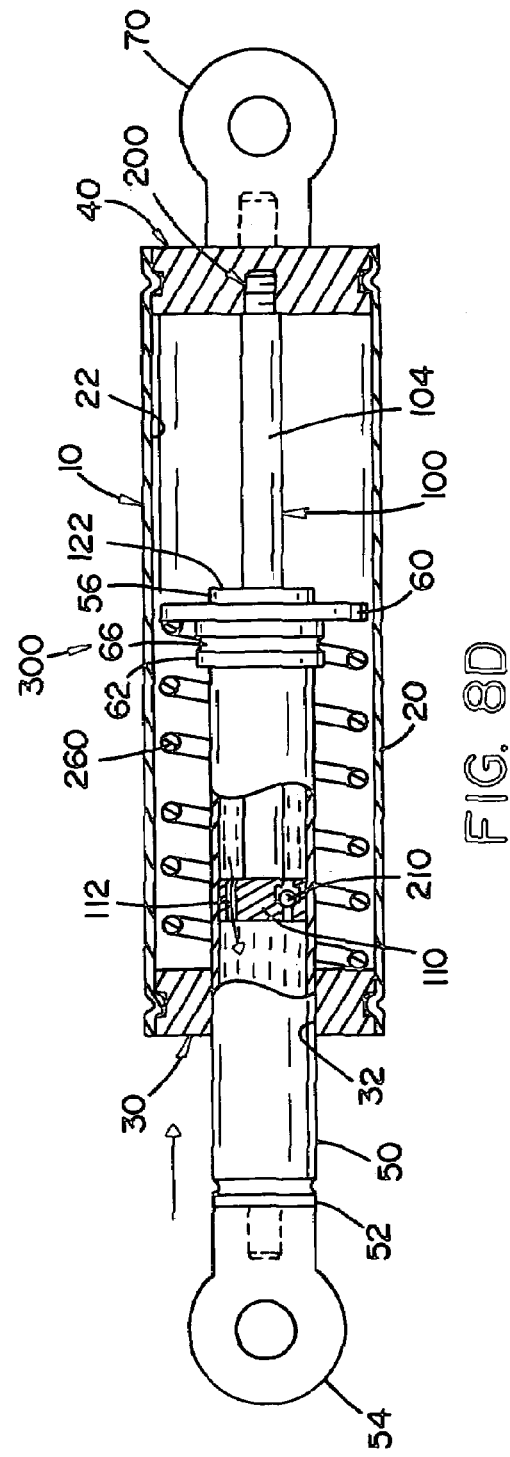

FORCE CONTROL STRUT

The present invention relates to a strut for controlling movement of a movable member such as a hood, top, door, hinged cover or other devices, which strut changes the force encountered by the movable element at various positions to thereby control motion.

INCORPORATION BY REFERENCE

The invention involves an elongated strut incorporating a compression spring or springs to control the force exerted on a movable element by either retracting or extending the strut. The movable element controls a structure such as a pivoted door or hood so the strut controls motion by controlling force. It is known to use an elongated strut having a cylindrical tube with a reciprocating element biased by one or more coil springs so the force of movement changes at different linear positions. A representative strut is shown in Adoline U.S. Pat. No. 6,773,002, which patent is incorporated by reference herein as background technology. Such elongated strut with coil springs controlling the linear force and, thus, movement has been modified to provide a damper mechanism carried by the extendable and retractable rod movable with respect to the tubular housing constituting the supporting structure of the strut. A dampened strut is described in patent publication No. U.S. 2004/0222,579, which publication is also incorporated by reference as background technology. Utilizing these two patented items, the purpose and operation of a motion controlled strut is known technology and need not be repeated.

BACKGROUND OF INVENTION

Coil spring elongated struts incorporated by reference herein utilize compression springs; however, these struts are not effective in controlling and selectively dampening the motion of the member to which they are attached. The prior art method for controlling the motion of an extendable strut is to match the compression spring rod loads to the application load, such as the weight of an automobile hood or trunk. Due to design limitation it is not always practical to exactly match or offset the load of the movable strut as it swings through its arc of movement. Consequently, closing speed of the hood or trunk lid varies throughout the movement stroke of these devices. There is a need to control motion of movement at a desired rate in various positions of the total travel.

THE INVENTION

The design of the present invention encompasses the concept of using a well known compression spring rod, such as shown in Adoline 6,773,002 wherein the compression spring strut replaces the solid movable rod with a rod having an internal damper mechanism. The invention utilizes a damper in combination with the rod of the prior art compression spring rod type strut. The damper used in the present invention is designed for low force, motion control applications. The damper can be used to allow the compression spring rod to compress at a controlled rate while extending without any dampening action. To control the force by using a dampening action during extension, the damper plunger is connected to the bottom plug. In this concept, there is a dampening action in the extension direction as well as in the compression or retraction directions. The invention involves combining a damper mechanism with a standard compression spring type of strut to provide force control during movement of a rod member in the compression direction.

In accordance with the invention, there is provided a force control strut which causes a controlled force during at least part of the stroke of a compression spring strut. The force or motion control strut comprises an elongated housing having a straight guide tube with inner cylindrical surface and axially opposite first and second ends. A rod member has an inner end reciprocally movable inside the housing and along the guide tube and an outer end extending outwardly from the first end of the housing. A guide member is secured to the first end of the housing to form a bushing allowing reciprocation of the rod member axially in the housing between a retracted position with the rod collapsed in the housing and an extended position with the rod protruding from the housing. At the bottom of the guide tube there is a fixed plug that closes the end of the housing. A cylindrical guide piston is fixed to the inner end of the movable rod and is slidable along the inner cylindrical surface of the tube. Between the piston and one end of the housing is a coil spring that biases the rod in a given direction in the housing. As so far described, the strut is like the compression spring rod shown in Adoline U.S. Pat. No. 6,773,002. The coil spring forces the rod member outwardly so that closing a member using the strut is balanced by the reactive force of the coil spring. In this manner, the strut exerts a force on the movable element controlled by the strut either in the retracted closing position or the extending opening position. To add a further control force during movement of the rod, a damper mechanism is combined with the movable rod. The damper mechanism includes a plunger reciprocally mounted in an elongated force controlled passageway inside the movable rod. The plunger of the damper mechanism is movable outwardly from an end of the rod facing inside the elongated housing. The distal end of the plunger is engageable with the bottom plug closing the housing. In this manner, the plunger is forced into the passageway to create a controlled force dampening movement of the operating rod in the housing.

In one embodiment, the main coil spring is located between the bottom plug and the guide piston of the rod. In another embodiment of the invention, the main coil spring is between the guide member and the guide piston. Consequently, the rod of the strut is either biased in the extended position or the retracted position according to the location of the main coil spring. To add the force controlling action of the damper mechanism, the distal end of the plunger merely abuts against the bottom plug as the rod member is retracted. Consequently, the damper force occurs only after the retraction or compression motion of the rod has caused the plunger of the damper mechanism to engage the bottom plug. In another embodiment, damping control is introduced in both the retraction and the extension direction. In this embodiment, the plunger is attached to the bottom plug. Thus, the plunger adds a damping force on a retraction and extension of the rod member. To change the controlled damping force created during the two opposite movements of the rod, the internal damper piston has at least one check valve. Thus, movement in one direction is dampened to a lesser amount than movement in the other direction. The disclosure reveals there are several embodiments and implementations of the invention. Essentially, a damper mechanism is added to a compression spring rod shown in Adoline U.S. Pat. No. 6,773,022. This concept allows several versions of a combined reciprocating rod with a damper plunger in a coil spring strut. The configuration of the damper mechanism and its connection with respect to the housing structure allows these several versions of the basic inventive concept.

The primary object of the present invention is the provision of an elongated strut having a coil spring biasing a rod member in either the retracted or extended position with a damper mechanism forming a part of the movable rod to add a controlled force during at least a portion of the travel of the rod.

Another object of the present invention is the provision of a strut, as defined above, which strut adds a dampening force during a certain portion of movement of the rod into and out of an elongated compression spring housing. The strut is capable of adding a controlled dampening force to different selected portions of the movement of the main rod of the strut.

Yet another object of the present invention is the provision of a strut, as defined above, which strut is easily manufactured, more economical and provides more force and motion versatility than existing struts.

Yet a further object of the present invention is the provision of a strut, as defined above, which strut controls the movement of a hood, door, cover, lid or other pivotal structures so that the movement of the structure has increased force control over a portion of the rod movement in a common coil spring strut.

These and other objects and advantages will become apparent from the following description, taken together with the accompanying drawings.

BRIEF DESCRIPTION OF DRAWINGS

FIG. 3A is a side elevational view of the strut shown in FIG. 2 assembled with the strut in the extended rest position;

FIG. 3B is a cross-sectional view, as shown in FIG. 3A, with the rod partially compressed;

FIG. 3C is a cross-sectional view of the strut, as shown in FIGS. 3A and 3B, with the rod fully compressed into the housing;

FIG. 3D is a cross-sectional view of the strut, as shown in FIGS. 3A, 3B and 3C, as the rod is being extended or returned by assistance of the coil spring;

FIG. 6A is a cross-sectional view of the strut shown in FIG. 5 with the rod in the fully extended position and the coil spring at rest;

FIG. 6B is a cross-sectional view of the strut, as shown in FIG. 6A, with the rod of the strut partially compressed against the damping action of the damper mechanism;

FIG. 6C is a cross-sectional view of the strut, as shown in FIGS. 6A and 6B, with the rod fully compressed;

FIG. 6D is a cross-sectional view of the strut, as shown in FIGS. 6A, 6B and 6C, with the rod moving in the extension direction against a controlled higher damper force;

FIGS. 7A, 7B, 7C and 7D are cross-sectional views of a strut similar to the strut shown in FIGS. 6A, 6B, 6C and 6D with the main coil spring moving the rod toward the retracted position; and, FIGS. 8A, 8B, 8C and 8D are a strut similar to the strut as shown in FIGS. 7A-7D, with the plunger attached to the bottom plug, as shown in FIG. 5.

PREFERRED EMBODIMENTS

Figure 1:
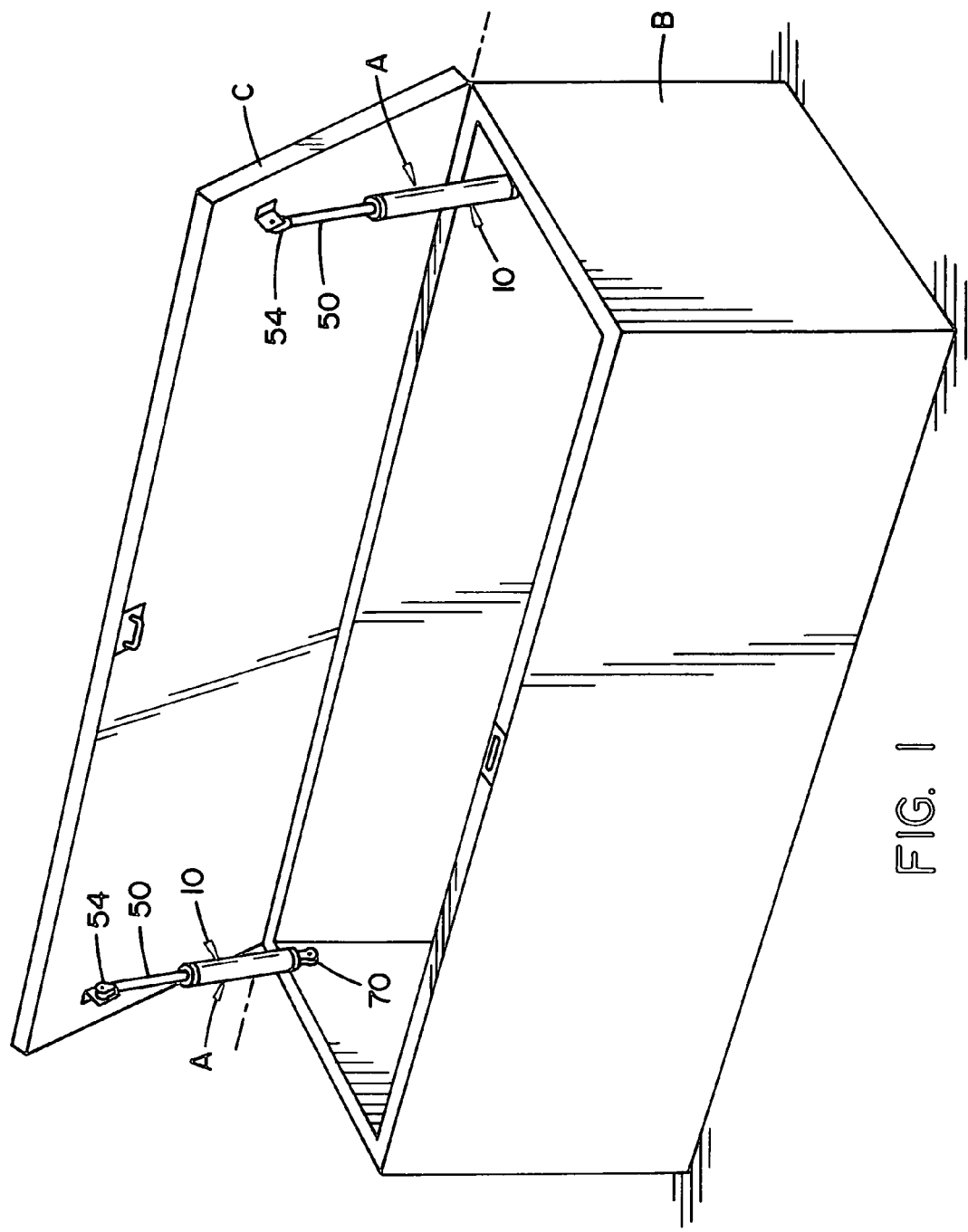
FIG. 1 is a pictorial view representing the primary use of the present invention wherein a door, hood, cover or lid is movable from an open position to a closed position against the force generated by the preferred embodiment of the present invention.

The compression spring rod shown in Adoline U.S. Pat. No. 6,773,002 utilizes an elongated housing with a reciprocal rod movable within the housing. One or more coil springs control the force profile in the compression or retracted direction, in the extended or retraction direction or in both directions. Operation of the coil spring structure in the Adoline patent is determined by the orientation of the control spring or springs. To adjust the spring force profile, two springs are often used and are wrapped in opposite directions, the springs having different modulus of expansion, different lengths or different combinations of such spring parameters. This type of coil spring is employed in an elongated strut to control the force necessary to open or close a pivoted member, such as a door, lid or cover. The present invention is an improvement over this prior coil spring device by adding further force controlling characteristics, for use in either the retracted or compression direction or in the extended, retracted direction. The preferred embodiment of the invention relates to an improved motion control strut operated in the compression orientation for controlling the force profile used while closing a lid. Application of such embodiment is schematically shown in FIG. 1 wherein two spaced struts A are mounted on box B for controlling the closing action of lid, door or cover C. This first preferred embodiment of the invention is shown in FIGS. 1, 3A, 3B, 3C and 3D. Strut A has an elongated housing 10 with the length necessary to determine the stroke of the strut. The housing has a first end 12 and a second end 14 defined by the ends of guide tube 20 closed at the first end by guide member 30 in the form of a bushing. This bushing has internal journal passage 32 and is held on the end of housing 10 by the combination of groove 34 in member 30 and crimped rim 36 on the first end of tube 20. To close the opposite end of the tube, bottom plug 40 is fixed by the interaction of groove 42 in the plug and crimped rim 44 on the second end of the tube. In this manner, member 30 and plug 40 close the opposite ends of tube 20 defining elongated housing 10 and having inner surface 22 for guiding reciprocal movement of rod member 50 extending through journal passage 32. In accordance with the prior Adoline patent, rod member 50 has an outer end 52 with first external connector 54 connected by threaded bore 54a and stud 54b. Inner end 56 of reciprocal rod member 50 carries guide piston 60 slidable along surface 22 of tube 20 and connected to the end of rod member 50 by the interaction of groove 64 and crimped rim 66. To mount strut A onto the structure as shown in FIG. 1, there is a second external connector 70 attached to fixed bottom plug 40 by stud 70b threaded into bore 70a. Since the first embodiment of the invention is a compression controlled strut A the coacting coil spring 80 is positioned between piston 60 and fixed bottom plug 40. In accordance with known technology, coil spring 80 which controls the compression force profile of rod member 50 often includes two concentric coil springs wrapped in opposite directions and having different lengths, different spring coefficients modulus or combination of these spring parameters to determine and force profile required to close lid C of box B. In operation, connector 54 of rod member 50 is moved to the left right as shown in FIG. 3B when cover C is closed. This collapses coil spring 80, or combines springs as previously discussed, to control the force profile of the closing action for cover C. The present invention relates to an improvement in this type of elongated strut.

Figure 2:
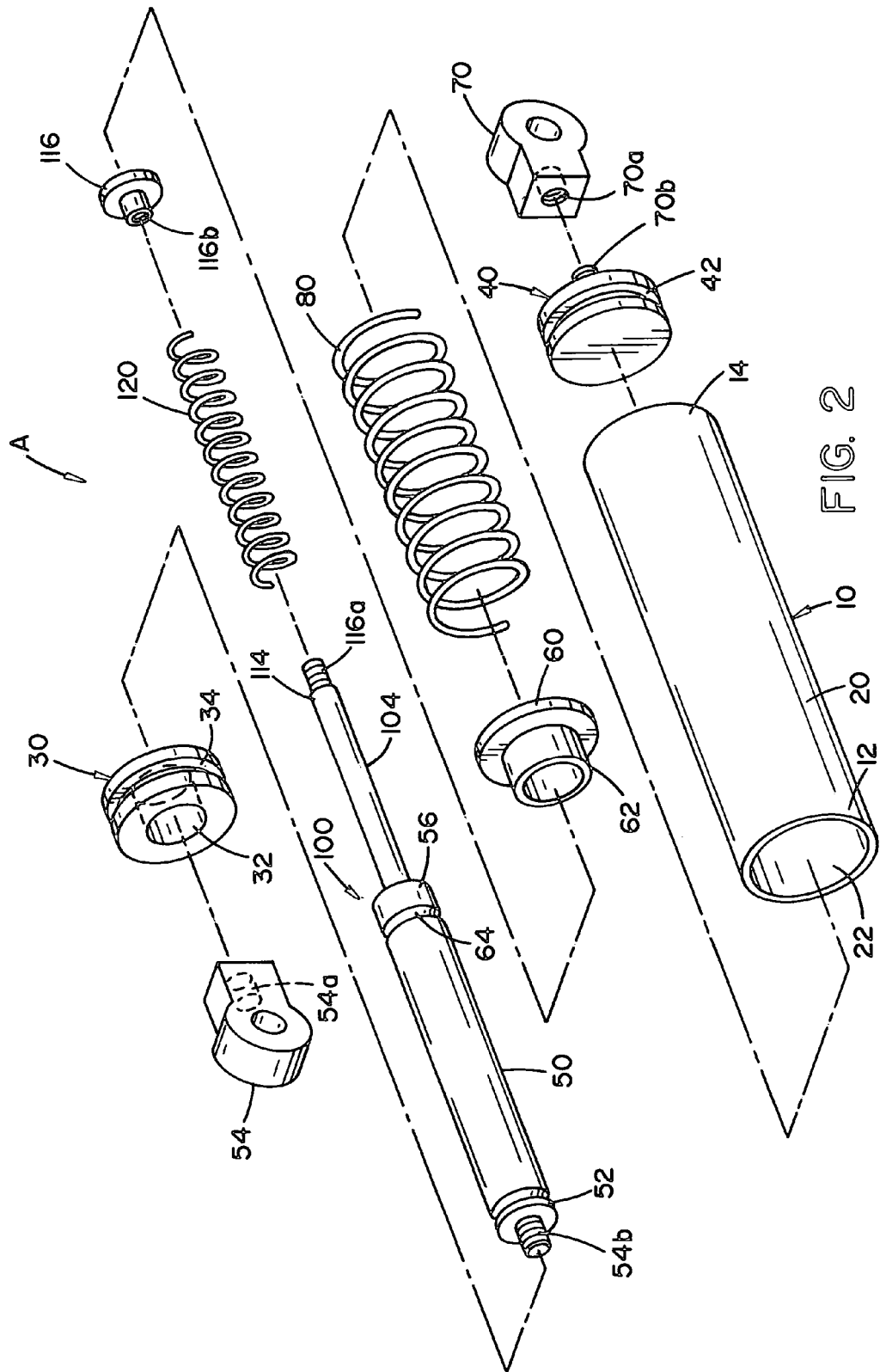
FIG. 2 is an exploded view of the first embodiment of the present invention wherein the strut is primarily a compression strut.

Compression strut A is modified so rod member 50 is combined with a damper mechanism 100 comprising a force controlling passageway 102 filled with an appropriate liquid. Plunger 104 with a piston 110 on the inner end of the plunger is reciprocated in passageway 102. Controlled force is determined by a calibrated bleed orifice 112 in piston 110. Movement of plunger 104 in either direction is dampened by the calibrated bleed orifice 112 so that distal end 114, having tip flange 116 secured to the plunger by stud 116a threaded into bore 116b, exerts a force based upon the interaction of piston 110 in passageway 102. The first embodiment of the invention shown in FIG. 2 is operated in accordance with the progressive positions of rod member 50 as illustrated in FIGS. 3A, 3B, 3C and 3D. Extension coil spring 120 surrounds plunger 104 and exerts an outer directed force between tip flange 116 and terminal portion 122 of rod member 50. In this first embodiment of the invention, plunger 104 is not connected or fixed to plug 40 but periodically abuts against or engages bottom plug 40 for adding the dampening force of mechanism 100 to the coil spring controlled force of strut A. As shown in FIG. 3A, strut A is in its extended rest position with tip flange 116 extended outwardly from rod 50 but spaced a distance a from fixed bottom plug 40. As lid or cover C is closed against the force exerted by strut A, initial movement of rod member 50 is against the force of coil spring 80 until rod member 50 moves the distance a. At that time, tip flange 160 engages bottom plug 40 to add the damping effect of piston 110 to the force profile experienced by downwardly moving cover C. This addition or combination of the coil spring force and the added damper force is continued until rod member 50 is fully compressed, as shown in FIGS. 3B and 3C. Consequently, the force of the coil spring or springs in tube 20 is added to the damping of mechanism 100. To extend rod member 50, tip flange 116 is immediately withdrawn from plug 40 so damper mechanism 100 has no effect in the retraction direction. During the retraction action as shown in FIG. 3D, extension coil spring 120 acting against end 122 of rod member 50 shifts plunger 104 to the fully retracted position by moving piston 110 in passageway 102. This action has no effect upon the extension movement of rod member 50, but merely prepares the damper mechanism by shifting the plunger to the position shown in FIG. 3A. Thereafter, strut A is conditioned for movement again between the positions shown in FIGS. 3A, 3B and 3C. In this manner, the compression of strut A is controlled first by the coil spring and then by a combination of the coil spring and novel damping mechanism 100, with the damping effect controlled by calibrated bleed orifice 112.

Figure 4:
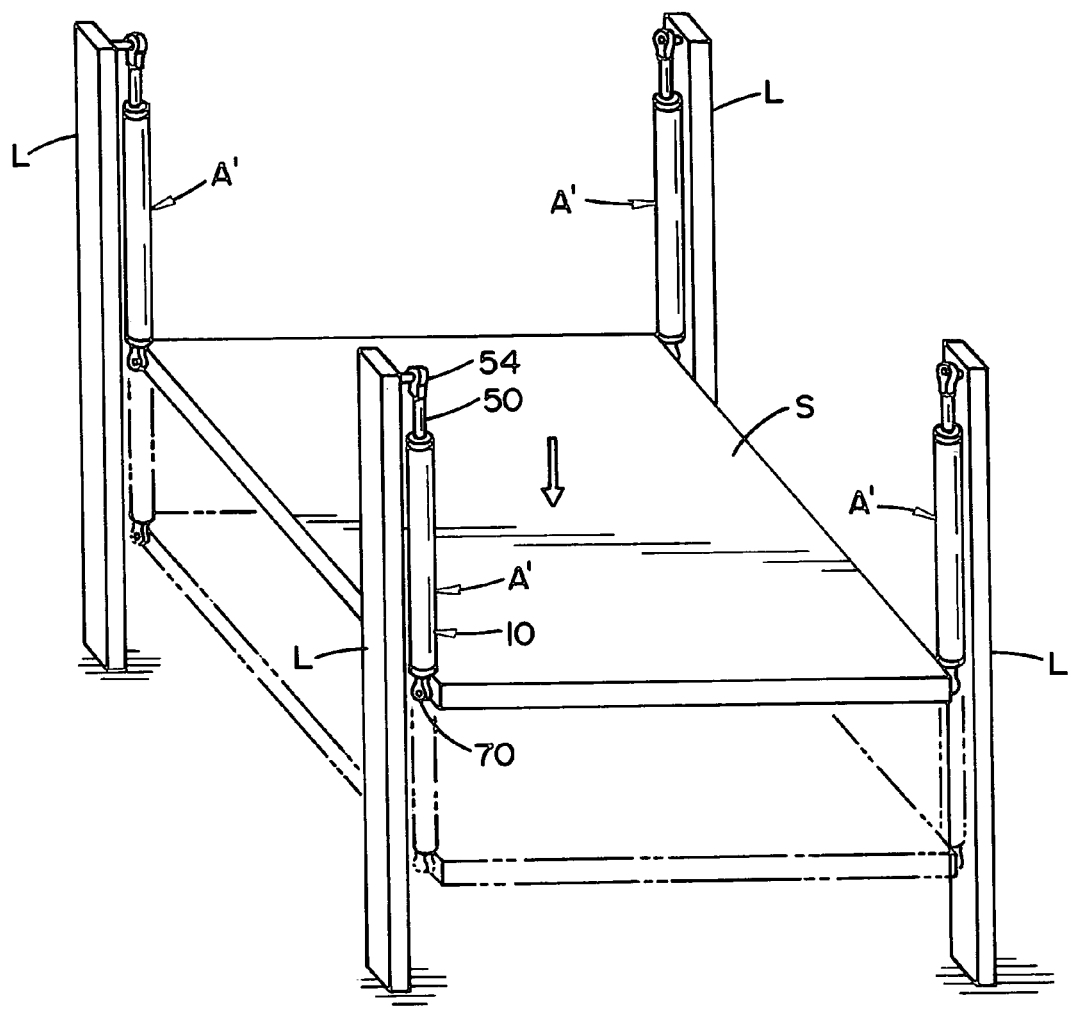
FIG. 4 is a pictorial view of a shelf movable in a vertical direction under the control of a strut constructed in accordance with a second embodiment of the present invention.
Figure 5:
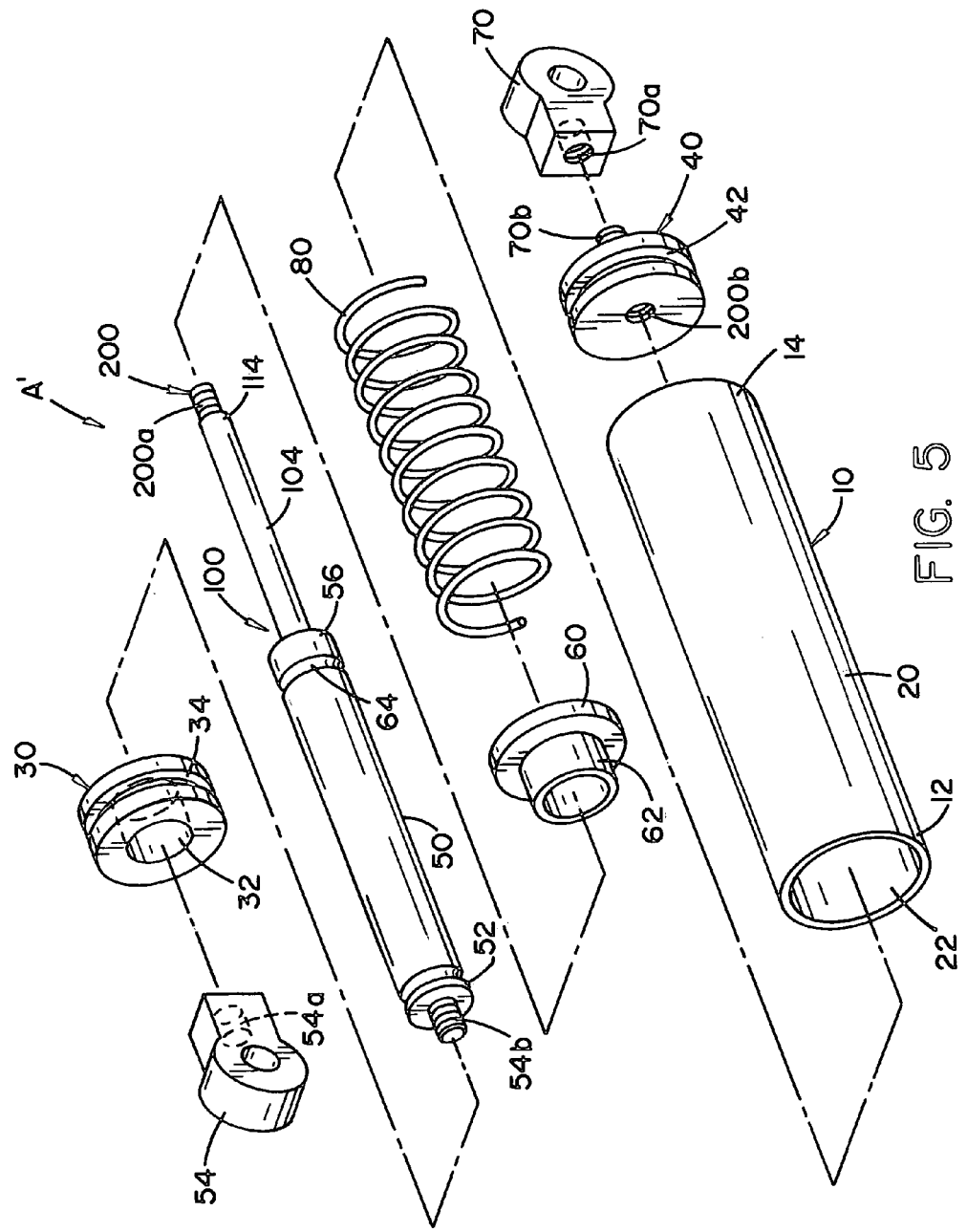
FIG. 5 is an exploded view of the second embodiment of the present invention wherein the strut has a damping action in both the extension and the compression directions.

As shown in FIGS. 4 and 5 a second embodiment of the invention operated in accordance with the positional views shown in FIGS. 3A, 3B, 3C and 3D. Struts A' are mounted between the top of legs L and movable shelf S to control the movement of shelf S as illustrated in FIG. 4. Strut A' is constructed to exert a damping control force in both movement directions of rod member 50. Many components used in first embodiment strut A are the same as components illustrated for use in the second embodiment strut A'. This particular strut is modified by attaching distal end 114 of plunger 104 onto bottom plug 40 by an attachment 200 in the form of stud 200a threaded into bore 200b. By using this second embodiment, damper mechanism 100 operates in both the extended direction of rod member 50 and the retracted direction of rod member 50. As shown in FIG. 6A, coil spring 80 is expanded to its rest position in housing 10, which extended position involves a small space between piston 60 and guide member or bushing 30. In the position shown in FIG. 6A, shelf S has been lowered and the movement has been controlled by the force of coil spring 80 as restricted by the damping force of damper mechanism 100. To retract the shelf, rod member 50 is moved to the right as shown in FIG. 6B to compress coil spring 80 against the resistance of force caused by the spring. At the same time, damper mechanism 100 controls the spring compression direction of rod member 50. Piston 110 moves in passageway 102 to add controlled force. In one implementation of this embodiment, calibrated orifice 122 controls movement of piston 110 in both directions. However, in the illustrated embodiment, one way valve 210 allows easier movement of the rod member as it is retracted. Retraction against coil spring 180 continues as shown in FIG. 6C where spring 80 is fully compressed and plunger 104 is moved into passageway 102 in a controlled damping action. Since one way valve 210 is opened in this direction, the damping force applied in compression is less than the damping force added to the spring force in extension as illustrated in FIG. 6D. During such extension, valve 210 is closed and the movement of piston 110 in force controlling passageway 102 is determined by the action of calibrated orifice 122. By attaching distal end 114 of plunger 104 onto bottom plug 40, the damper mechanism operates in both directions.

As illustrated in FIGS. 6A-6D, strut A' adds a controlling damper force during movement of rod member 50 in both directions. The amount of damping force changes with velocity and can be varied in the opposite directions, if desired. This action is different from strut A shown in FIG. 2 where the added damping force occurs only during compression of the strut. Strut A is modified to produce a retraction controlled strut 250 as shown in FIGS. 7A-7D. In this embodiment of the invention, compression spring 80 is replaced by compression spring 260 located between guide member or bushing 30 and piston 60 riding along surface 22 of tube 20. End flange 116 periodically abuts against bottom plug 40, as in strut A. This causes controlled retraction, as illustrated. In FIG. 7A, strut 250 is at rest with rod member 50 retracted into housing 10 and plunger 104 collapsed into passageway 102. During extension, as illustrated in FIG. 7B, rod member 50 is moved outwardly against compression spring 260. Damper mechanism 110 has no effect and spring 120 merely moves plunger 104 to the right cocking it for the next retraction of strut 250. The fully extended position of rod member 50 is illustrated in FIG. 7C. This position has been reached by movement against the compressive force of coil spring 260 which, as in other embodiments, may be two oppositely wound coil springs with different lengths, different spring modulus or a combination of these parameters. After strut 250 is fully extended as shown in FIG. 7C, it is retracted as shown in FIG. 7D until it reaches the position shown in FIG. 7A. This retraction is controlled by the relaxation of coil spring 260 at a controlled rate together with a controlled movement of plunger 104 into passageway 102. A single calibrated orifice 122 controls the movement of piston 110 in both directions. This damper force acts against the spring expansion force of coil 260, only when the coil is being retracted as shown in FIG. 7D.

The damping force and spring force are combined during movement of rod member in both directions when coil spring 250 is between guide journal 30 and piston 60. When the rod member is moved in the retracted direction and, distal end 114 is connected to bottom plug 40 by attachment arrangement 200. The spring acts against the damper force when rod member 50 is retracted or extended. This modification of strut A' of FIG. 7 is schematically illustrated in FIGS. 8A-8D. In this embodiment, piston 110 includes a one way valve 210 so that there is a substantial damping force exerted during the retraction of rod member 50 as shown in FIG. 8D. Movement of the rod in the opposite direction as shown in FIG. 8B has a lesser amount of damping force applied against movement of spring 260.

All embodiments of the invention combines a damper force to a coil spring operated strut so that a damping force is applied to movement of the strut in one or more directions. Several embodiments and implementations of this invention are illustrated; however, a person skilled in the art could devise other uses of a center damper mechanism to add a damping force in one or both directions of a coil spring controlled strut.

Having thus defined the invention, the following is claimed:

1. A force control strut comprising an elongated housing having an axis and axially opposite first and second ends and an internal chamber with an inner surface, a rod member coaxial with said axis and having an inner end reciprocally movable inside said housing and along said internal chamber and an outer end extending outwardly of said first end of said housing, a guide member secured at or near said first end of said housing to allow reciprocation of said rod member axially in said housing between a retracted position and an extended position relative to said housing, a bottom plug fixed at least partially in said internal chamber at or near said second end of said housing, a guide piston secured at or near said inner end of said rod member and slideable along said inner surface of said internal chamber, a first coil spring positioned between said guide piston and said bottom plug to bias said rod member in said extended position in said housing, a first external connector fixed at or near said outer end of said rod member, a second connector fixed at or near said bottom plug, and a damper combined with said rod member, said damper including a plunger having first and seconds ends and a plunger piston, said plunger piston and said first end of said plunger reciprocally mounted in an elongated force controlling passageway inside said rod member and coaxial with said rod member, said plunger piston movable in said passageway of said rod member between a compressed and uncompressed position, said second end of said plunger engageable with said bottom plug to force said plunger piston to move in said passageway toward said compressed position to at least partially dampen movement of said rod member in said housing as said rod member moves toward said bottom plug, said plunger including a plunger biasing arrangement to bias said plunger in said uncompressed position, said plunger biasing arrangement positioned at least partially between said inner end of rod member and said bottom plug.

2. The strut as defined in claim 1, wherein said plunger is designed to periodically abut against said bottom plug as said guide piston compresses said first coil spring while moving toward said bottom plug, said plunger not connected to said bottom plug.

3. The strut as defined in claim 1, wherein said plunger biasing arrangement includes a plunger spring positioned between said second end of said plunger and said inner end of said rod member.

4. The strut as defined in claim 1, wherein plunger piston including a first orifice to allow fluid flow in at least one direction through said first orifice when said plunger piston moves in said force controlling passageway inside said rod member.

5. The strut as defined in claim 4, wherein said first orifice is a calibrated orifice.

6. The strut as defined in claim 4, wherein said plunger biasing arrangement includes a plunger spring positioned between said second end of said plunger and said inner end of said rod member.

7. The strut as defined in claim 4, wherein said plunger is designed to periodically abut against said bottom plug as said guide piston compresses said first coil spring while moving toward said bottom plug, said plunger not connected to said bottom plug.

8. A force control strut comprising an elongated housing having an axis and axially opposite first and second ends and an internal chamber with an inner surface, a rod member coaxial with said axis and having an inner end reciprocally movable inside said housing and along said internal chamber and an outer end extending outwardly of said first end of said housing, a guide member secured at or near said first end of said housing to allow reciprocation of said rod member axially in said housing between a retracted position and an extended position relative to said housing, a bottom plug fixed at least partially in said internal chamber at or near said second end of said housing, a guide piston secured at or near said inner end of said rod member and slidable along said inner surface of said internal chamber, a first coil spring positioned between said guide piston and said bottom plug to bias said rod member in said extended position in said housing, a first external connector fixed at or near said outer end of said rod member, a second connector fixed at or near said bottom plug, and a damper combined with said rod member, said damper including a plunger having first and seconds ends and a plunger piston fixed at or near said first end of said plunger, said plunger piston and said first end of said plunger reciprocally mounted in an elongated force controlling passageway inside said rod member and coaxial with said rod member, said plunger piston movable in said passageway of said rod member between a compressed and uncompressed position, said second end of said plunger engagable with said bottom plug to force said plunger piston to move in said passageway toward said compressed position to at least partially dampen movement of said rod member in said housing as said rod member moves toward said bottom plug, said plunger piston including a first orifice to allow fluid flow in at least one direction through said first orifice when said plunger piston moves in said force controlling passageway inside said rod member, said plunger including a plunger spring positioned between said second end of said plunger and said rod member, said plunger spring biasing said plunger in said uncompressed position, said plunger including a tip flange on said distal end of said plunger, said plunger spring engaging said tip flange.

9. The strut as defined in claim 8, wherein said plunger spring has a different coefficient of compression than said first coil spring.

10. A force control strut comprising an elongated housing having an axis and axially opposite first and second ends and an internal chamber with an inner surface, a rod member coaxial with said axis and having an inner end reciprocally movable inside said housing and along said internal chamber and an outer end extending outwardly of said first end of said housing, a guide member secured at or near said first end of said housing to allow reciprocation of said rod member axially in said housing between a retracted position and an extended position relative to said housing, a bottom plug fixed at least partially in said internal chamber at or near said second end of said housing, a guide piston secured at or near said inner end of said rod member and slidable along said inner surface of said internal chamber, a first coil spring positioned between said guide piston and said bottom plug to bias said rod member in said extended position in said housing, a first external connector fixed at or near said outer end of said rod member, a second connector fixed at or near said bottom plug, and a damper combined with said rod member, said damper including a plunger having first and seconds ends and a plunger piston fixed at or near said first end of said plunger, said plunger piston and said first end of said plunger reciprocally mounted in an elongated force controlling passageway inside said rod member and coaxial with said rod member, said plunger piston movable in said passageway of said rod member between a compressed and uncompressed position, said second end of said plunger engagable with said bottom plug to force said plunger piston to move in said passageway toward said compressed position to at least partially dampen movement of said rod member in said housing as said rod member moves toward said bottom plug, said plunger piston including a first orifice to allow fluid flow in at least one direction through said first orifice when said plunger piston moves in said force controlling passageway inside said rod member, said plunger including a plunger spring positioned between said second end of said plunger and said rod member, said plunger spring biasing said plunger in said uncompressed position.

11. The strut as defined in claim 10, wherein said first orifice is a calibrated orifice.

12. The strut as defined in claim 10, wherein said plunger is spaced from said bottom plug when said rod member is in a fully extended position.

13. The strut as defined in claim 10, wherein said plunger spring has a different coefficient of compression than said first coil spring.

14. The strut as defined in claim 10, wherein said plunger is designed to periodically abut against said bottom plug as said guide piston compresses said first coil spring while moving toward said bottom plug, said plunger not connected to said bottom plug.

15. The strut as defined in claim 14, wherein said first orifice is a calibrated orifice.

16. The strut as defined in claim 14, wherein said plunger spring has a different coefficient of compression than said first coil spring.

17. The strut as defined in claim 14, wherein said plunger is spaced from said bottom plug when said rod member is in a fully extended position.

* * * * *